US012603338B2

(12) United States Patent
Kim et al.

(10) Patent No.: US 12,603,338 B2
(45) **Date of Patent: \*Apr. 14, 2026**

(54) ACTIVE MATERIAL RECOVERY METHOD USING POSITIVE ELECTRODE SCRAP

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 580 days.

This patent is subject to a terminal disclaimer.

(21) Appl. No.: 18/016,217

(22) PCT Filed: Jun. 29, 2021

(86) PCT No.: PCT/KR2021/008206
§ 371 (c)(1),
(2) Date: Jan. 13, 2023

(87) PCT Pub. No.: WO2022/045557
PCT Pub. Date: Mar. 3, 2022

(65) Prior Publication Data
US 2023/0275278 A1 Aug. 31, 2023

(30) Foreign Application Priority Data
Aug. 24, 2020 (KR) ........................ 10-2020-0106083

(51) Int. Cl.
*H01M 10/54* (2006.01)
*H01M 4/02* (2006.01)
(Continued)

(52) U.S. Cl.
CPC ......... *H01M 10/54* (2013.01); *H01M 4/0471* (2013.01); *H01M 4/505* (2013.01); *H01M 4/525* (2013.01); *H01M 2004/028* (2013.01)

(58) Field of Classification Search
None
See application file for complete search history.

(56) References Cited

U.S. PATENT DOCUMENTS 11,901,528 B2 * 2/2024 Kim ........................ C22B 7/001
2012/0068107 A1 3/2012 Chung et al.
(Continued)

FOREIGN PATENT DOCUMENTS

CN 105895854 A 8/2016
CN 109309266 A 2/2019
(Continued)

OTHER PUBLICATIONS

English Machine translation of KR-20130138523-A , 2013, Sun.*
(Continued)

*Primary Examiner* — Susan D Leong
(74) *Attorney, Agent, or Firm* — Bryan Cave Leighton Paisner LLP

(57) ABSTRACT

A method of recovering an active material from a positive electrode scrap and reusing the active material is provided. The method includes (a) heat treating a positive electrode scrap including a positive electrode active material layer on a current collector in air to thermally decompose a binder and a conductive material in the positive electrode active material layer, separating the current collector from the positive electrode active material layer, and recovering an active material in the positive electrode active material layer, wherein the active material comprises a lithium composite transition metal oxide; (b) washing the recovered active material with a cleaning solution; (c) adding a lithium precursor to the washed active material and annealing the active material; and (d) optionally performing surface coating on the annealed active material and obtaining a reusable active material, wherein an amount of the lithium precursor added in step (c) is determined so that an amount of a
(Continued)

remaining lithium compound in the reusable active material is 0.0001 to 1.2 wt %.

13 Claims, 5 Drawing Sheets

(51) Int. Cl.
    *H01M 4/04*           (2006.01)
    *H01M 4/505*         (2010.01)
    *H01M 4/525*         (2010.01)

(56)                   References Cited

U.S. PATENT DOCUMENTS

| | | | |
|---|---|---|---|
| 2012/0091391 A1* | 4/2012 | Tsuchida | H01M 10/052 252/182.1 |
| 2013/0313485 A1 | 11/2013 | Kim et al. | |
| 2014/0056797 A1 | 2/2014 | Kabe et al. | |
| 2014/0264185 A1 | 9/2014 | Kim et al. | |
| 2015/0030928 A1* | 1/2015 | Kwak | H01M 4/505 264/618 |
| 2018/0212282 A1 | 7/2018 | Lee et al. | |
| 2020/0227743 A1 | 7/2020 | Eom et al. | |
| 2023/0082541 A1* | 3/2023 | Kim | C22B 7/001 427/122 |
| 2024/0106020 A1* | 3/2024 | Seong | C01G 53/44 |
| 2024/0369962 A1* | 11/2024 | Nada | G03G 21/1619 |

FOREIGN PATENT DOCUMENTS

| | | | | | |
|---|---|---|---|---|---|
| CN | 109704412 | A | 5/2019 | | |
| CN | 110165324 | A | 8/2019 | | |
| CN | 110842006 | A | 2/2020 | | |
| JP | 3452769 | B2 | 7/2003 | | |
| JP | 6055761 | B2 | 12/2016 | | |
| KR | 10-2003-0011737 | A | 2/2003 | | |
| KR | 20110024856 | A | 3/2011 | | |
| KR | 10-2012-0030865 | A | 3/2012 | | |
| KR | 10-1294335 | B1 | 8/2013 | | |
| KR | 20130138523 | A | * 12/2013 | ........... | H01M 4/505 |
| KR | 10-1439427 | B1 | 9/2014 | | |
| KR | 10-2017-0033787 | A | 3/2017 | | |
| KR | 10-2018-0087615 | A | 8/2018 | | |
| KR | 10-2019-0032452 | A | 3/2019 | | |
| KR | 10-2019-0106406 | A | 9/2019 | | |

OTHER PUBLICATIONS

Sun eng machine translation (Year: 2013).*
Sieber Tim et al: "Recovery of Li (Ni0.33 Mn0.33 Co0.33)O2 from Lithium-Ion Battery Cathodes: Aspects of Degradation", Nanomaterials, vol. 9, No. 2, Feb. 12, 2019, p. 246, XP93054531.
Zuo Daxian et al: "Recent progress in surface coating of cathode materials for lithium ion secondary batteries", Journal of Alloys and Compounds, Elsevier Sequoia, Lausanne, CH, vol. 706, Feb. 24, 2017, pp. 24-40, XP029950253.

* cited by examiner

FIG. 6

ACTIVE MATERIAL RECOVERY METHOD USING POSITIVE ELECTRODE SCRAP

CROSS-REFERENCE TO RELATED APPLICATIONS

This application is a National Phase entry pursuant to 35 U.S.C. § 371 of International Application No. PCT/KR2021/008206, filed on Jun. 29, 2021, and claims the benefit of and priority to Korean Patent Application No. 10-2020-0106083, filed on Aug. 24, 2020, the disclosures of which are incorporated by reference in their entirety for all purposes as if fully set forth herein.

TECHNICAL FIELD

The present disclosure relates to a method of recycling resources when manufacturing a lithium secondary battery. In particular, the present disclosure relates to a method of recovering and reusing a positive electrode active material from a positive electrode scrap generated in a lithium secondary battery manufacturing process or from a lithium secondary battery that is discarded after use.

BACKGROUND

Lithium secondary batteries which may be repeatedly charged and discharged are in the spotlight as an alternative to fossil energy. Lithium secondary batteries have been mainly used in traditional handheld devices such as cell phones, video cameras, and power tools. However, recently, application fields of lithium secondary batteries have been gradually increasing to electric vehicles (EVs, HEVs, and PHEVs), large capacity energy storage systems (ESSs), uninterruptible power supply systems (UPS), etc.

A lithium secondary battery includes an electrode assembly in which unit cells having a structure in which a positive electrode plate and a negative electrode plate coated with an active material on a current collector are arranged with a separator interposed therebetween, and an exterior material sealing and accommodating the electrode assembly together with an electrolyte, that is, a battery case. The positive electrode active material of the lithium secondary battery mainly uses a lithium-based oxide, and the negative electrode active material uses a carbon material. The lithium-based oxide contains a metal such as cobalt, nickel, or manganese. In particular, cobalt, nickel, and manganese are very expensive valuable metals. Among these, cobalt is a strategic metal, and each country in the world has a special interest in supply and demand of cobalt. Since the number of cobalt producing countries is limited, it is known as a metal whose supply and demand is unstable worldwide. If an imbalance in the supply and demand of raw materials of strategic metals occurs, raw material prices are highly likely to rise.

Conventionally, research on recovering and recycling these valuable metals from lithium secondary batteries (waste batteries) which are discarded when their lifespan is completed after use has been mainly conducted. In addition to waste batteries, it is more preferable if resources may be recovered from wastes discarded after the positive electrode plate is punched or from the positive electrode in which a defects occur during the process. Currently, when manufacturing a lithium secondary battery, as shown in FIG. 1, a positive electrode sheet 30 is manufactured by forming a positive electrode active material layer 20 in which a long sheet type positive electrode current collector 10 such as aluminum (Al) foil is coated with a positive electrode slurry in which a positive electrode active material, a conductive material, a binder, a solvent, etc. are mixed, and then a positive electrode plate 40 is punched to a certain size. A part remaining after punching is discarded as a positive electrode scrap 50. If it is possible to recover the positive electrode active material from the positive electrode scrap 50 and reuse the positive electrode active material, it would be very desirable from an industrial-economic point of view and an environmental point of view.

Conventionally, in most cases, a method of recovering the positive active material dissolves a positive electrode in hydrochloric acid, sulfuric acid, nitric acid, etc., and then extracting an active material element such as cobalt, nickel, manganese, etc., and reuses the active material element as a raw material for the synthesis of the positive active material. However, the method of extracting the active material element using an acid has disadvantages in that a process of or recovering pure raw materials is not environmentally friendly as well as requires a neutralization process and a wastewater treatment process, which increases the process cost. In addition, the method has a disadvantage in that lithium, which is one of the main elements of the positive electrode active material, may not be recovered. In order to solve these disadvantages, a method of directly reusing the active material without dissolving the positive electrode active material and extracting the active material in element form is required.

Furthermore, a method of maximally preventing the loss of constituent elements such as lithium during the process of obtaining a reusable active material is desirable. The loss of constituent elements such as lithium must be prevented as much as possible so as not to be significantly different from the composition of a fresh active material that has never been used. By doing so, a process of adding insufficient components may be minimized.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is designed to solve the problems of the related art, and therefore the present disclosure is directed to providing a method of recovering and reusing an active material from a positive electrode scrap.

Technical Solution

In one aspect of the present disclosure, there is provided a method for recovering a positive electrode active material including (a) heat treating a positive electrode scrap including a positive electrode active material layer on a current collector in air to thermally decompose a binder and a conductive material in the positive electrode active material layer, separating the current collector from the positive electrode active material layer, and recovering an active material in the positive electrode active material layer, wherein the active material comprises a lithium composite transition metal oxide; (b) washing the recovered active material with a cleaning solution; (c) adding a lithium precursor to the washed active material and annealing the active material; and (d) optionally performing surface coating on the annealed active material, and obtaining a reusable active material, wherein an amount of the lithium precursor added in step (c) is determined such that an amount of a remaining lithium compound in the reusable active material is 0.0001 to 1.2 wt %.

Heat treating may be performed at 300 to 650° C., in particular, for 10 minutes to 24 hours.

Heat treating may be performed at 550° C. as a temperature increase rate of 5° C./min for 30 minutes.

The cleaning solution may be water. Alternatively, the cleaning solution may be a lithium compound aqueous solution showing basicity in an aqueous solution state. The lithium compound aqueous solution may contain a lithium compound more than 0% and equal to or less than 15%, and preferably uses LiOH. The washing step (b) may be performed within one week, preferably within one day, and more preferably within one hour.

The washing may be performed by impregnating the recovered active material in the lithium compound aqueous solution and at the same time stirring the recovered active material.

The lithium precursor may include at least one of LiOH, $Li_2CO_3$, $LiNO_3$ and $Li_2O$.

The lithium precursor may be added by an amount that corresponds to a molar ratio of 0.09 to 0.12 of lithium further added with respect to a molar ratio of lithium to other metals in the recovered active material of 1:1.

For another example, without drying after the washing, the lithium precursor may be added in step (c) by mixing the washed active material in a lithium precursor solution and spray drying the active material. At this time, a temperature of the spray drying is preferably 100 to 300° C.

The annealing may be performed at 400 to 1000° C. in the air.

A temperature of the annealing may exceed a melting point of the lithium precursor.

The active material in the active material layer may be recovered in powder form, and a carbon component generated by carbonization of the binder or the conductive material may not remain on a surface.

The surface coating may include a coating of at least one of a metal, an organic metal and a carbon component on a surface of the annealed active material using a solid or liquid method and then performing heat treatment at 100 to 1200° C.

The reusable active material is represented by Chemical Formula 1 below, $$Li_aNi_xMn_yCo_zM_wO_{2+\delta} \qquad (1)$$

wherein M includes at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, and $x+y+z+w=1$.

The reusable active material may include a content of fluorine (F) equal to or less than 100 ppm.

Advantageous Effects

According to the present disclosure, a waste positive electrode active material such as a positive electrode scrap generated during a manufacturing process of a lithium secondary battery may be recovered without using an acid, and thus it is eco-friendly. The method according to the present disclosure does not require a neutralization process or a wastewater treatment process, thereby relaxing environmental issues and reducing process costs.

According to the present disclosure, the positive electrode active material may be recovered without an unrecoverable metal element. Since a current collector is not dissolved, the current collector may also be recovered. The method may directly reuse the active material recovered in powder form, rather than extracting an active material element and using the active material element as a raw material for synthesizing a positive electrode active material again, and thus it is economical.

According to the present disclosure, toxic and explosive solvents such as NMP, DMC, acetone, and methanol are not used, and thus it is safe, and simple processes such as heat treatment, washing, and annealing, etc., are used, and thus it is easy to manage process and is suitable for mass production.

According to the present disclosure, the electrochemical performance of the recovered active material does not deteriorate, and excellent resistance and capacity properties may be implemented.

In particular, according to the present disclosure, the loss of lithium in the active material may be minimized during a heat treatment process for separating the current collector and a washing process for surface modification, such as the removal of residues. The loss of lithium may be minimized by optimizing the heat treatment process as well as the amount of the current collector reacting with the active material or precipitating by heat treatment may be minimized Since the loss of lithium element is maximally prevented during the process of obtaining the reusable active material, the composition of a fresh active material is not significantly different from that of the recovered active material. Insufficient lithium is added through an additional lithium precursor addition process. In this regard, the amount of added precursor is determined considering the amount of the remaining lithium compound, and thus it is preferable in terms of process and cost.

According to the present disclosure, a recovery process is optimized by limiting the amount of the remaining lithium compound, and thus capacity and cycle properties may be improved. Even if the lithium precursor is added as much as lost, an error may occur due to an analysis such as ICP. In addition, even if the capacity has been restored as much as the initial fresh positive electrode active material, if a large amount of lithium compound remains, the defect rate of a cell unit may increase because the lithium compound reacts with an electrolyte to generate side reactions or gases in the cell unit. In the present disclosure, the lithium precursor is added so as to limit the content of the remaining lithium compound, these problems may be solved.

According to another aspect of the present disclosure, since the active material to be recovered may be granulated again through spray drying even if particles are broken due to rolling in the previous process, it is possible to improve a particle size and a specific surface area. In addition, if the washed active material is mixed with a lithium precursor solution and spray dried, since it is possible to supplement the lithium precursor while again granulating the active material simultaneously, there is an effect of process simplification, and there is an advantage in that a continuous process with the previous washing step is possible.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 3 to 5 show results of cell evaluation using active materials of an embodiment and comparative examples, wherein FIG. 3 shows initial charging/discharging properties, FIG. 4 is an enlarged view of a partial period of FIG. 3, and FIG. 5 shows C-rate properties.

FIG. 6 is a graph of a pH titration result.

DETAILED DESCRIPTION

Figure 1:
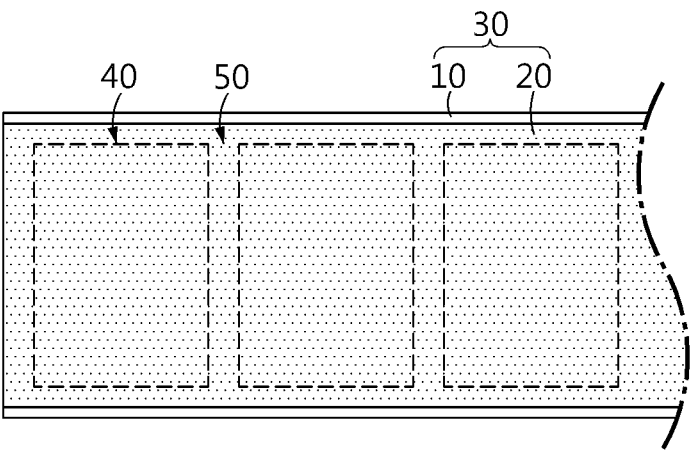
FIG. 1 is a diagram showing a positive electrode scrap discarded after a positive electrode plate is punched from a positive electrode sheet.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the following description, reference is made to the accompanying drawings, which form a part hereof. The illustrative embodiments described in the detailed description, drawings, and claims are not meant to be limiting. Other embodiments may be utilized, and other changes may be made, without departing from the sprit and scope of the subject matter presented herein. It will be readily understood that the aspects of the present disclosure, as generally described herein, and illustrated in the drawings, may be arranged, substituted, combined, separated, and designed in a wide variety of different configurations, all of which are explicitly contemplated herein.

Unless defined otherwise, all technical and scientific terms used herein generally have the same meaning as commonly understood by one of ordinary skill in the art to which the disclosure belongs.

The present disclosure is not to be limited in terms of the particular embodiments described in this application, which are intended as illustrations of various aspects. Many modifications and variations can be made without departing from its spirit and scope, as will be apparent to one of ordinary skill in the art. Functionally equivalent methods and apparatuses within the scope of the disclosure, in addition to those enumerated herein, will be apparent to one of ordinary skill in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In the case of the conventional active material recycling process, the main purpose was to extract valuable metals (nickel, cobalt, manganese, etc.) as elements in the lithium secondary battery active material whose performance has deteriorated after use and resynthesize the active material, whereas, there is a difference in that the present disclosure recovers the active material from a positive electrode scrap generated during a lithium secondary battery manufacturing process.

Furthermore, in the case of the already known active material recycling process, a chemical method of extracting a valuable metal through acid/base dissolution or melting using reduction/additive, and manufacturing the valuable metal as a metal (a direct reduction method) or a resynthesized active material is added, which additionally incurs the complexity of process and the economic cost. However, the present disclosure relates to a method of directly reusing a positive electrode active material without dissolving the positive electrode active material.

In order to directly recover the positive electrode active material, a method of removing a current collector from a positive electrode is required. To remove the current collector from the positive electrode, it is possible to remove a binder through high temperature heat treatment, to melt the binder using a solvent, to completely melt the current collector, to select the active material through dry grinding and sieving, etc.

The stability of the solvent is important in dissolving the binder using the solvent. Although NMP is the most efficient solvent, NMP has the disadvantages of toxicity and high price. In addition, there is a disadvantage that a solvent recovery process such as reprocessing a waste solvent is required. Melting the current collector may be cheaper than using the solvent. However, since it is difficult to remove foreign substances from the surface of the recovered active material and hydrogen gas is generated during a current collector removal process, there is a risk of explosion. It is difficult to completely separate the current collector and the active material by dry grinding and sieving. Since the particle size distribution of active materials is changed during a grinding process, and it is difficult to remove the binder, there is a disadvantage in that the properties of a reused battery deteriorate.

In the present disclosure, the active material and the current collector are separated by high temperature heat treatment. In particular, since heat treatment is performed in the air, a special apparatus configuration is not required, and since it is a relatively simple process that only needs heating, it is advantageous for mass production and commercialization. However, foreign substances should not remain on the surface of the recovered active material. In the present disclosure, even a step of removing foreign substances from the surface of the recovered active material is proposed.

Figure 2:
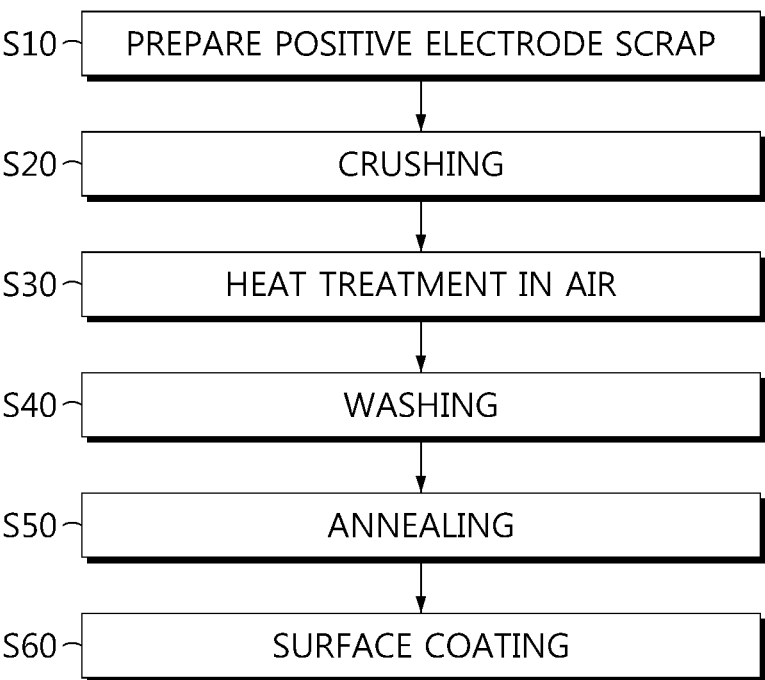
FIG. 2 is a flowchart of an active material recovery method according to the present disclosure.

Hereinafter, an active material recovery method according to an embodiment of the present disclosure is described with reference to FIG. 2. FIG. 2 is a flowchart of an active material recovery method according to the present disclosure.

Referring to FIG. 2, first, a discarded positive electrode scrap is prepared (step s10).

As described above with reference to FIG. 1, the positive electrode scrap may be a part remained after manufacturing a positive electrode sheet including a lithium composite transition metal oxide positive electrode active material layer on a current collector and punching the positive electrode sheet. In addition, the positive electrode scrap may be prepared by collecting positive electrodes in which defects occur during a process. In addition, the positive electrode scrap may be prepared by separating a positive electrode from a discarded lithium secondary battery after use.

For example, a slurry manufactured by adding and mixing N-methyl pyrrolidone (NMP) to an active material that is a lithium cobalt oxide such as $LiCoO_2$(LCO), or an NCM-based active material including nickel (Ni), cobalt (Co) and manganese (Mn), carbon-based carbon black as a conductive material, and polyvinylidene fluoride (PVdF) that is a binder is coated on a sheet type current collector made of aluminum foil, and then, dried in a vacuum oven at about 120° C. to manufacture a positive electrode sheet, and a positive electrode plate of a certain size is punched and the remaining positive electrode scrap may be prepared.

Lithium composite transition metal oxides are used as the positive electrode active material of a lithium secondary battery, and among these, lithium cobalt oxide of $LiCoO_2$, lithium manganese oxide ($LiMnO_2$ or $LiMn_2O_4$, etc.), lithium iron phosphate compound ($LiFePO_4$, etc.) or lithium nickel oxide ($LiNiO_2$, etc.) are mainly used. In addition, as a method of improving a low thermal stability while maintaining an excellent reversible capacity of $LiNiO_2$, a nickel manganese-based lithium composite metal oxide in which a part of nickel (Ni) is substituted with manganese (Mn) having excellent thermal stability and an NCM-based lithium composite transition metal oxide in which a part of nickel (Ni) is substituted with manganese (Mn) and cobalt (Co) are used. In the present disclosure, in particular, the recovery of the NCM-based lithium composite transition metal oxide active material is proposed.

As described above, the positive electrode scrap has an active material layer on a current collector of a metal foil such as aluminum foil. The active material layer is formed by coating a slurry in which an active material, a conductive material, a binder, a solvent, etc. are mixed, and has a structure in which the binder connects the active material and the conductive material after the solvent is volatilized. Therefore, if the binder is removed, the active material may be separated from the current collector.

Next, the positive electrode scrap is crushed to an appropriate size (step s20). Crushing refers to cutting or shredding of the positive electrode scrap into pieces of suitable and easy-to-handle size. After crushed, the positive electrode scrap is cut into small pieces, for example, 1 cm×1 cm. For crushing, various dry grinding equipment such as hand-mill, pin-mill, disk-mill, cutting-mill and hammer-mill may be used, or a high speed cutter may be used.

Crushing may be performed in consideration of the characteristics required in the equipment used in the handling of the positive electrode scrap and subsequent processes. For example, in the case of using equipment that requires continuous processing in loading and unloading the positive electrode scrap, the fluidity of the positive electrode scrap must be good, and thus too large positive electrode scrap must be crushed.

Now, the positive electrode scrap is heat treated in the air (step s30).

In the present disclosure, heat treatment is performed to thermally decompose the binder in the active material layer. At this time, heat treatment may be performed at 300 to 650° C., which may be called high temperature heat treatment. At a temperature less than 300° C., it is difficult to remove the binder, which causes a problem that the current collector may not be separated. At a temperature equal to or greater than 650° C., the current collector melts (Al melting point: 660° C.), which causes a phenomenon that the current collector may not be separated.

A heat treatment time is maintained so that the binder may be sufficiently thermally decomposed. For example, the heat treatment time is maintained for 10 minutes to 24 hours at the heat treatment temperature indicated above. Preferably, the heat treatment time is set to be equal to or greater than 30 minutes. The longer the heat treatment time, the longer the time for thermal decomposition of the binder to occur, but there is no difference in the thermal decomposition effect when the heat treatment time exceeds a certain time. Also, it is undesirable in terms of lithium reduction. Heat treatment equipment may be various types of furnaces. For example, the heat treatment equipment may be a box type furnace or a rotary kiln capable of continuous processing in consideration of productivity.

After heat treatment, the positive electrode scrap may be slowly cooled or rapidly cooled in the atmosphere.

For example, heat treatment may be performed at 550° C. for 30 minutes at a temperature rise rate of 5° C./min. The temperature rise rate may be implemented without difficulty, for example, in a box type furnace and may be heated without generating a thermal shock, etc. to the positive electrode scrap. 550° C. is to allow the thermal decomposition of the binder to occur well while considering the melting point of the Al current collector. At this temperature, since heat treatment for less than 10 minutes is insufficient for thermal decomposition, heat treatment should be performed for more than 10 minutes, and for more than 30 minutes if possible.

As the binder and the conductive material in the active material layer are thermally decomposed through heat treatment in the air and become $CO_2$ and $H_2O$ and removed. Since the binder is removed, the active material is separated from the current collector, and the active material to be recovered may be selected in powder form. Accordingly, only in step s30, the current collector may be separated from the active material layer and the active material in the active material layer may be recovered.

It is important to perform heat treatment of step s30 in the air. If heat treatment is performed in a reducing gas or inert gas atmosphere, the binder and the conductive material are not thermally decomposed and only carbonized. When the binder and the conductive material are only carbonized, a carbon component remains on the surface of the active material, which degrades the performance of the reused active material. When heat treatment is performed in the air, since a carbon material in the binder or the conductive material reacts with oxygen and is burned and removed as CO and $CO_2$ gases, both the binder and the conductive material are almost removed without remaining.

Therefore, according to the present disclosure, the active material is recovered in powder form, and the carbon component generated by carbonization of the binder or the conductive material may not remain on the surface.

Next, the recovered active material is washed (step s40). Upon washing, a cleaning solution is used. The cleaning solution may simply be water. Alternatively, the cleaning solution may be a lithium compound aqueous solution. In particular, a lithium compound aqueous solution showing basicity in an aqueous solution state is preferable. This lithium compound aqueous solution is prepared to contain a lithium compound more than 0% and equal to or less than 15%, and preferably uses LiOH. The amount of LiOH is preferably equal to or less than 15%. The use of an excess of LiOH may leave an excess of LiOH on the surface of the active material even after washing, which may affect an annealing process in the future. In order to clean the surface of the active material in a pre-annealing step as much as possible, since an addition of the excess of LiOH is not good for the process, the addition is limited to equal to or less than 15%.

Washing may be performed by immersing the recovered active material in such an aqueous lithium compound solution. After immersion, washing may be performed within one week, preferably within one day, and more preferably within one hour. If washing is performed for more than one week, there is a risk of capacity degradation due to an excessive elution of lithium. A washing time may be determined in consideration of lithium dissipation. For example, in the case of a composition having a relatively high content of Ni in the NCM-based active material, since an amount of lithium dissipation increases as the washing time increases, it is better not to lengthen the washing time as much as possible. Therefore, it is preferable to set the washing time within one day or within one hour. In the case of a composition having a relatively low content of Ni, the lithium dissipation is relatively small if the washing time does not exceed one week. Therefore, it is good to perform washing within one week, preferably within one day, or within one hour. Washing includes immersing the active material in a cleaning solution such as a lithium compound aqueous solution showing basicity in an aqueous solution state, stirring the active material in an immersion state, etc. It is good to perform stirring with immersing as much as possible. If the active material is only immersed in the cleaning solution without stirring, the washing process may be slowly performed and may cause lithium leaching. Since the process time may be minimized if stirring is performed with immersing, it is preferable to proceed stirring simultaneously with impregnation of the cleaning solution. After washing, simply drying may be performed, or a spray drying step presented in another example below may be performed without drying. First, when drying is performed immediately after washing, drying may be performed in the air in a convection type oven after filtration.

The reason for washing is to remove LiF and metal fluoride which may be present on the surface of the recovered active material, and to perform surface modification. During heat treatment of step s30, the binder and the conductive material in the active material layer become $CO_2$ and $H_2O$ and are vaporized and then removed. In this process, $CO_2$ and $H_2O$ react with lithium on the surface of the active material to form $Li_2CO_3$ and LiOH, and fluorine (F) present in a binder such as PVdF reacts with a metal element constituting the positive electrode active material to form LiF or metal fluoride. If LiF or metal fluoride remains, battery properties deteriorate when the active material is reused. In the present disclosure, reactants that may have been generated on the surface of the recovered active material during heat treatment of step s30 are removed by adding washing of step s40, and thus foreign substances do not remain on the surface of a recycle active material.

In particular, it is more preferable to wash the active material with the lithium compound aqueous solution showing basicity in an aqueous solution state. If an aqueous solution of sulfuric acid or hydrochloric acid is used rather than the lithium compound aqueous solution showing basicity in the aqueous solution state, F on the surface of the active material may be washed, but the performance of the recovered positive electrode active material degrades by eluting transition metals (Co and Mg) present in the active material. The lithium compound aqueous solution showing basicity in the aqueous solution state used in the present disclosure is very desirable because the lithium compound aqueous solution may remove the binder that is likely to remain in a trace amount even after the thermal decomposition of step s30 as well as may supplement the amount of lithium that may be eluted in the washing process without eluting the transition metal, etc. present in the active material.

Through step s40, in the present disclosure, it is possible to adjust the content of LiF on the surface of the recovered active material to less than 500 ppm, through which the capacity improvement effect may be achieved. Preferably, the content of F may be set to be equal to or less than 100 ppm. More preferably, the content of F may be set to be equal to or less than 30 ppm. As described above, through washing, LiF or a lithium metal compound formed by decomposition of the binder is removed, and thus electrical resistance properties may be improved.

Next, a lithium precursor is added to the washed active material and annealed (step s50).

Although the loss of lithium in the active material intends to be minimized during previous steps s30 and s40, an unavoidable loss of lithium may occur. In step s50, such loss of lithium is compensated. The lithium precursor may be added in a solid or liquid phase. The lithium precursor used for an annealing process may be any one or more of LiOH, $Li_2CO_3$, $LiNO_3$, and $Li_2O$.

To mix a solid lithium precursor, drying is performed after step s40, and then material mixing is performed, and in this case, a powder mixing or milling process is used.

To mix a liquid lithium precursor, it is preferable to mix the washed active material with the lithium precursor solution without drying after step s40 and spray dry the lithium precursor solution. As the lithium precursor solution, a lithium compound soluble in an aqueous solution or an organic solvent may be used. The temperature of the spray drying step may be 100 to 300° C. It is preferable that the minimum temperature is equal to or greater than 80° C. This is because when the minimum temperature is equal to or less than 80° C., a problem in which the solution is not completely dried may occur. More preferably, when the minimum temperature is equal to or greater than 100° C., the solution may be completely dried.

During spray drying, as the lithium precursor solution is dried immediately after spraying, the lithium precursor component is coated or contacted on the surface of the active material. In this regard, there is also an advantage in that particles are agglomerated by a capillary force when drying the lithium precursor solution which is a solvent, and the particles are adjusted. In the case of a positive electrode scrap made of an electrode, the particles on the surface may be pressed and cracked or broken by the rolling process. In particular, compared to LCO, the NCM-based active material has high particle splitting due to rolling during formation of the electrode. Compared to a fresh active material, since the recovered active material includes many small particles, there is a problem of non-uniformity in the particles. In particular, the NCM-based active material including large particles that are secondarily granulated by gathering primary particles having a size of several tens to hundreds of nm is used. In a process of rolling a positive electrode made of such an active material so as to adjust the porosity in the electrode, secondary particles are split to be primarily granulated or smaller particles that have larger sizes than that of the secondary particles but are smaller than large particles. Since the specific surface area of the active material increases as the number of particles broken by rolling increases, in the case of a recovered active material obtained from the rolled electrode, there may be problems that may affect slurry properties, electrode adhesion, and electrode performance when reused.

In order for the active material to be at a reusable level, it is desirable that the particle size distribution should not be different from that of the fresh active material. Since spray drying may recover large particles by aggregating small particles that are split during rolling, spray drying may solve the non-uniformity in the particles and also make a particle size close to the initial characteristics of the fresh active material. In particular, the effect is excellent in the NCM-based active material which has severe particle breakage during the rolling of the previous process.

As such, when spray drying is used, the lithium precursor is coated on the surface of the active material, and the active material is obtained by adjusting the particles. Since the addition of the lithium precursor, granulation, and drying are performed in one step, there is an effect of simplifying the process. Since the active material particles washed in step s40 are merely mixed and dispersed in a lithium precursor solution of a certain concentration and then spray dried, there is an advantage that a continuous process is possible for washing in step s40 and addition of the lithium precursor in step s50.

In step s50, the properties of the recovered active material are restored or improved to the level of a fresh active material that has never been used by restoring a crystal structure of the active material through annealing. Through the previous steps s30 and s40, a deformed structure may appear on the surface of the active material. For example, in the active material which is an NCM-based lithium composite transition metal oxide, in step s40, a spinel structure in which Ni is rock salted [$NiCO_3 \cdot 2Ni(OH)_2)H_2O$] by moisture may be formed. If a battery is manufactured as it is, battery properties such as capacity reduction may deteriorate. In the present disclosure, the crystal structure is restored through step s50. For example, the active material which is the NCM-based lithium composite transition metal oxide is restored to a hexagonal structure again. Accordingly, it is possible to restore or improve the initial properties of the active material to a level similar to that of the fresh active material.

Furthermore, in the case of an LCO active material, $Co_3O_4$ may be generated by thermal decomposition on the surface. If a battery including $Co_3O_4$ is manufactured, battery properties may deteriorate. In the present disclosure, the initial properties of the active material may be restored or improved to the level similar to that of the fresh active material by restoring the crystal structure and removing $Co_3O_4$ through step s50.

The lithium precursor is added before annealing by an amount that may be added as much as a ratio of lithium lost compared to a ratio of lithium to other metals in the raw material active material (i.e., a fresh active material) used in the active material layer. However, even if the lithium precursor is added as much as lost, an error may occur due to an analysis such as ICP. In addition, even if the capacity has been restored as much as the initial fresh positive electrode active material, if a large amount of lithium compound remains, the defect rate of a cell unit may increase because the lithium compound reacts with an electrolyte to generate side reactions or gases in the cell unit. That is, the addition of an excess amount of lithium precursor other than the amount of lithium lost through washing, etc. causes an unreacted lithium precursor to remain in the recovered active material, which serves to increase resistance in an active material recovery process, and thus it is necessary to administer an appropriate amount of the lithium precursor. It is most preferable that the amount of the remaining lithium compound be 0, but it is almost impossible to set the amount to 0. Therefore, the present disclosure proposes an acceptable amount of the remaining lithium compound with respect to the capacity and lifespan properties. The present disclosure proposes that at least the content of the remaining lithium compound should be 0.0001 to 1.2 wt %.

In particular, in the present disclosure, after a reusable active material is obtained when all processes end, an addition amount of the lithium precursor in step s40 (when spray drying is used) or s50 is determined so that the amount of the remaining lithium compound in the active material is 0.0001 to 1.2 wt %. Since the remaining lithium compound varies depending on a type of the lithium precursor, it may affect the remaining amount of the lithium compound such as LiOH or $Li_2CO_3$, and thus the type of the lithium precursor or the type of the remaining lithium compound is not particularly limited. However, as mentioned above, if at least one of LiOH, $Li_2CO_3$, $LiNO_3$ and $Li_2O$ is used as the lithium precursor, the lithium precursor is preferably added by an amount of lithium that may be further added at a molar ratio equal to or less than 0.12 with respect to 1:1 that is a molar ratio of lithium to other metals in step s40 (when spray drying is used) or s50. Then, after the reusable active material is obtained when all processes end, the amount of the remaining lithium compound in the active material may be equal to or less than 1.2 wt %. In the case of manufacturing a secondary battery using such an active material, it is possible to maintain a lifespan characteristic while suppressing a side reaction caused by an electrolyte.

As shown in the experimental examples to be described later, as a result of measuring samples with different amounts when supplementing the loss of lithium, if the amount of the remaining lithium compound exceeds 1.2 wt %, the lifespan properties deteriorate. The smaller the remaining lithium compound, the better. However, it is difficult to accurately set the remaining lithium compound to 0 (there is an error in the measuring equipment). Therefore, in the present disclosure, the lower limit of the remaining lithium compound is considered to be equal to or greater than 0.0001 wt %. In order for the amount of the remaining lithium compound to be 0.0001 to 1.2 wt %, the amount of the lithium precursor added to supplement the loss of lithium must be appropriate. The present disclosure proposes an optimization range between the content of the remaining lithium compound and the addition amount of the lithium precursor to restore the initial capacity and lifespan properties of the recovered positive electrode active material.

Annealing may be performed at 400 to 1000° C. in the air. An annealing temperature may be 600 to 900° C. This temperature should be changed within a limited range depending on a type of the lithium precursor. It is preferable to set the annealing time to be equal to or greater than one hour. Preferably, the annealing time is about 5 hours. If the annealing time is long, the crystal structure may be sufficiently recovered, but even if the annealing time is a long time, the performance of the active material is not significantly affected. The annealing time is, for example, within 15 hours. Annealing equipment may use the same or similar equipment as in heat treatment of step s30.

For example, when $Li_2CO_3$ is used as a lithium precursor, the annealing temperature is preferably 700 to 900° C., more preferably 710 to 780° C. This is because the melting point of $Li_2CO_3$ is 723° C. Most preferably, annealing is performed at 750° C. In the case of using LiOH as a lithium precursor, the annealing temperature is preferably 400 to 600° C., more preferably 450 to 480° C. This is because the melting point of LiOH is 462° C.

The annealing temperature is preferably a temperature exceeding the melting point of the lithium precursor. However, at a temperature exceeding 1000° C., thermal decomposition of the positive electrode active material occurs and the performance of the active material deteriorates, and thus the temperature should not exceed 1000° C.

Through this step s50, a reusable active material may be obtained.

Next, as a selective step, step s60 may be further performed. In step s60, surface coating is applied to the active material annealed in step s50.

The surface coating step may be coating at least one of metal, organic metal and a carbon component on the surface in a solid or liquid manner and then heat treating the coated one at 100 to 1200° C. When heat treatment is performed at a temperature exceeding 1200° C., there is a risk of performance degradation due to thermal decomposition of the positive electrode active material. In the surface coating step, coating on the surface in the solid or liquid manner may use methods such as mixing, milling, spray drying, grinding, etc.

A surface protective layer is formed by a heterogeneous metal through surface coating. When a molar ratio of lithium to other metals in the positive electrode active material is 1:1 by supplementing the lost lithium, if the lithium in the active material reacts with a surface coating material, and the molar ratio of lithium to other metals in the positive electrode active material decreases to less than 1:1, 100% capacity expression may not be achieved. Therefore, insufficient lithium is added in the previous step s50 so that not only the molar ratio of lithium to other metals in the positive electrode active material is 1:1 but also further an excess of lithium should be added to include more lithium compared to other metals in the positive electrode active material. Then, during surface coating, the molar ratio of lithium to other metals in the positive electrode active material is 1:1, and the surface protective layer may be formed. Therefore, when even a process of forming the surface protective layer is performed, it is preferable to further add lithium to be used as a material of the surface protective layer in addition to simply adding the lost lithium in the process. For example, not only the molar ratio of lithium to other metals in the positive electrode active material is 1:1 but also an excess of lithium is added to include more lithium by a molar ratio of 0.0001 to 0.12 compared to other metals in the positive electrode active material. Then, during surface coating, the molar ratio of lithium to other metals in the positive electrode active material is 1:1, and the surface protective layer may be formed. When the surface protective layer is not formed, it is not necessary to add the excess of lithium. As described above, the addition amount of the lithium precursor should be determined in consideration of whether the surface protective layer is formed. As mentioned above, after the reusable active material is obtained when all processes end, the amount of the lithium precursor should be determined so that the amount of the remaining lithium compound in the active material is 0.0001 to 1.2 wt %.

Specifically, when a metal oxide such as B, W, B-W, etc. coated on the active material and then heat treated, a lithium boron oxide layer may be formed on the surface of the active material and serves as the surface protective layer. The lithium added in step s50 reacts with the metal oxide such as B, W, B-W, etc. in step s60, and the molar ratio of lithium to other metals in the positive electrode active material does not decrease to less than 1:1, and thus there is no capacity degradation.

The reusable active material obtained by the above-described method may be represented by the following chemical formula 1.

$$Li_aNi_xMn_yCo_zM_wO_{2+\delta}$$  [Chemical Formula 1]

(In Chemical Formula 1 above, M includes at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, and x+y+z+w=1.)

The reusable active material may have a content of F equal to or less than 100 ppm. According to the present disclosure, since it is possible to recover an active material having a reduced content of F, if the active material having the reduced content of F is reused as an active material, excellent resistance properties and capacity properties may be implemented.

In particular, the active material recovery method according to the present disclosure is optimized for an NCM-based active material. This is because the NCM-based active material has a large specific surface area compared to an LCO-based active material since the NCM-based active material includes secondary particles in which primary particles are aggregated and it is difficult to control the amount of the remaining lithium compound.

As described above, according to the present disclosure, the active material and the current collector are separated during heat treatment of step s30. A decrease of lithium in the active material after heat treatment may be minimized, by optimizing the heat treatment process temperature, time, etc. Then, the amount of lithium precursor to be added later may be minimized.

LiF or metal fluoride is removed during washing of step s40. Washing is safe and inexpensive, may remove LiF or metal fluoride without loss of other elements, and prevent elution of transition metals, etc. In particular, the decrease of lithium in the active material may be minimized, by optimizing conditions of the cleaning solution, the washing time, etc. Then, the amount of lithium precursor to be added later may be minimized. If an aqueous solution of a lithium compound showing basicity in an aqueous solution is used as the cleaning solution during washing, there is also advantage of supplementing the loss of lithium occurring during the process.

As described above, according to the present disclosure, the loss of lithium in the active material may be minimized during a heat treatment process for separating the current collector and a washing process for surface modification, such as the removal of residues. The loss of lithium may be minimized by optimizing the heat treatment process as well as the amount of the current collector reacting with the active material or precipitating by heat treatment may be minimized. In addition, the loss of lithium in the active material may be minimized while removing LiF which may act as a resistance if remains. Since the loss of lithium element is maximally prevented during the process of obtaining the reusable active material, the composition of a fresh active material is not significantly different from that of the recovered active material. Insufficient lithium is added through an additional lithium precursor addition process. In this regard, the addition amount of the lithium precursor is determined so that the amount of the remaining lithium compound in the reusable active material is 0.0001 to 1.2 wt %, and thus excellent lifespan and capacity properties may be maintained.

If spray drying is used to add a lithium precursor, since the active material to be recovered may be granulated again through spray drying even if particles are broken due to rolling in the previous process, it is possible to improve a particle size and a specific surface area. In addition, if the cleaned active material is mixed with a lithium precursor solution and spray dried, since it is possible to supplement the lithium precursor while again granulating the active material simultaneously, there is an effect of process simplification, and there is an advantage in that a continuous process with the previous washing step is possible.

The annealing step after addition of the lithium precursor also has advantage of being safe and inexpensive, effectively removing $Co_3O_4$, and recovering the cell properties of the reusable active material by recovering the crystal structure, that is, by improving crystallinity.

The reusable active material obtained according to the present disclosure may have a particle size distribution similar to that of the fresh active material, and thus separate treatment for adjusting the particle size distribution may not be required. Since the carbon component generated by carbonization of the binder or the conductive material does not remain on the surface, a step for removing the carbon component, etc. is not required. Accordingly, the active material obtained through the method of FIG. 2 described above may be reused as is without additional treatment and used to manufacture the positive electrode.

It is also possible to use 100% of the recovered active material as is without adjusting the composition, or mix the recovered active material with a fresh active material and mix the recovered active material with a conductive material, a binder, and a solvent to make and use a slurry.

Hereinafter, experimental examples of the present disclosure are described in detail.

EXPERIMENTAL EXAMPLES

Experimental Example 1: Analysis of Molar Ratio of Lithium to Other Metals after Performing Each Step of Positive Electrode Active Material Recovery Method Each positive electrode active material was prepared using a method below, and the molar ratio of lithium to other metals was measured and summarized in Table 1 below.

Sample 1: A fresh NCM-based lithium composite transition metal oxide was used, other than a recovered active material.

Sample 2: A positive electrode scrap to be discarded after punching a positive electrode plate having an NCM-based lithium composite transition metal oxide active material was prepared and heat treated at 500° C. in the air for 5 hours, and then the active material was collected. That is, in the active material recovery method of the present disclosure as described above, only up to heat treatment of step s30 is performed to remove the binder and the conductive material, separate the Al current collector, and collect the NCM-based lithium composite transition metal oxide active material. At this time, the positive electrode plate was manufactured from a slurry prepared by weighing 96.25 wt % of the positive active material, 1.5 wt % of carbon black that is a conductive material, and 2.25 wt % of PVdF (content of resin of 9.8 wt % with respect to PVdF 1100) that is a binder and mixing them with NMP.

Sample 3: Sample 2 was additionally washed for 10 minutes according to the washing step (s40) of the active material recovery method of the present disclosure. As the cleaning solution, an aqueous solution containing LiOH was used.

Sample 4: Only annealing of step s50 was performed on Sample 3 without an addition of a lithium precursor. Annealing was performed at 750° C. in the air for 15 hours.

Sample 5: Annealing of step s50 was performed on Sample 3 at 750° C. in the air for hours by adding $Li_2CO_3$ at a molar ratio of 0.05 as a lithium precursor.

Sample 6: Annealing of step s50 was performed on Sample 3 at 750° C. in the air for hours by adding $Li_2CO_3$ at a molar ratio of 0.08 as a lithium precursor.

Sample 7: Annealing of step s50 was performed on Sample 3 at 750° C. in the air for hours by adding $Li_2CO_3$ at a molar ratio of 0.09 as a lithium precursor.

Sample 8: Annealing of step s50 was performed on Sample 3 at 750° C. in the air for hours by adding $Li_2CO_3$ at a molar ratio of 0.1 as a lithium precursor.

Sample 9: The annealing of step s50 was performed on Sample 3 in the air at 750° C. for 15 hours by adding $Li_2CO_3$ as a lithium precursor in a 0.11 molar ratio.

Sample 10: Only annealing of step s50 was performed on Sample 3 without an addition of a lithium precursor. Annealing was performed at 750° C. in the air for 5 hours shorter than in Sample 4.

TABLE 1

| Sample No. | Molar ratio of lithium to other metals |
|---|---|
| 1 | 1.02 |
| 2 | 1 |
| 3 | 0.93 |
| 4 | 0.92 |
| 5 | 0.97 |
| 6 | 1 |
| 7 | 1.01 |
| 8 | 1.01 |
| 9 | 1.05 |
| 10 | 0.92 |

Referring to Table 1, it may be seen that, as compared to Sample 1, the molar ratio of lithium to other metals tends to gradually decrease as even one step of the active material recovery method is performed. That is, lithium is lost even when only heat treatment is performed as in Sample 2, and more lithium is lost when washing is performed as in Sample 3. In particular, Sample 4 which was annealed at 750° C. for 15 hours without the addition of the lithium precursor shows a result that even a molar ratio of about 0.1 decreases compared to Sample 1. As such, lithium is lost during heat treatment, washing, and annealing, and thus the addition of lithium is necessary.

From Sample 5 to Sample 9, the addition amount of the lithium precursor gradually increases, and the molar ratio of lithium to other metals gradually increases. To supplement the decrease in the molar ratio of about 0.1 in Sample 4 compared to Sample 1, upon reviewing Sample 7 annealed by adding $Li_2CO_3$ at the molar ratio of 0.09 and Sample 8 annealing by adding $Li_2CO_3$ at the molar ratio of 0.1, the molar ratio of lithium to other metals is 1.01. Considering that ICP has an equipment measurement error at a molar ratio of ±0.02, the molar ratios of lithium to other metals of Samples 7 and 8 may have a range of a molar ratio of 0.99 to 1.03, which is determined to be equivalent to Sample 1. Samples 5 and 6 to which $Li_2CO_3$ is added at the molar ratio less than 0.09 have smaller molar ratios of lithium to other metals than that of Sample 1. Therefore, it may be confirmed that when the lithium precursor is added (Sample 8) similarly to a decrease ratio (the molar ratio of 0.1 in Sample 1 to Sample 4) confirmed in Sample 4 which was annealed without the addition of the lithium precursor, the molar ratio of lithium to other metals may be increased to an equivalent level compared to Sample 1. In addition, Sample 10 has a decreased annealing time after washing compared to Sample 3, but it may be seen that there is no change in the molar ratio of lithium to other metals. That is, it was confirmed that even if the annealing time is equal to or greater than 5 hours, there was no significant effect on the decrease of lithium.

It was confirmed through the above experiment that it is preferable to add the lithium precursor, and in particular, under the conditions of this experimental example, if the lithium precursor is added at the molar ratio equal to or greater than 0.09, the lithium precursor may have a content of lithium similar to that of the fresh active material. It may be seen that the amount of the lithium precursor that needs to be added to exhibit the content of lithium similar to that of the fresh active material may vary depending on the experimental conditions.

Experimental Example 2: Addition of Lithium Precursor and Experiment of Boron Coating Each positive electrode active material was prepared using methods below, a positive electrode was manufactured, then a cell (Coin Half Cell, CHC) was manufactured, and electrochemical performance thereof was evaluated.

Comparative Example 1: A fresh NCM-based lithium composite transition metal oxide was used, like sample 1.

Embodiment 1: Up to annealing was performed like Sample 8 but an annealing time was set to 5 hours shorter than Sample 8. That is, the positive electrode scrap was heat treated at 550° C. in the air for 30 minutes, washed for 10 minutes, and annealed at 750° C. for 5 hours by adding $Li_2CO_3$ at a molar ratio of 0.1 as a lithium precursor.

Embodiment 2: In addition to Embodiment 1, an active material surface protective layer recovery process of optional step s60 of FIG. 2 was also performed. A protective layer was recovered on the surface of the active material by adding and heat treating 500 ppm of boron at 300° C. for 5 hours.

Embodiment 3: Same as Embodiment 2, except that the addition amount of lithium precursor was a molar ratio of 0.11 which is greater than the molar ratio of 0.1 in Embodiment 2.

Embodiment 4: Same as Embodiment 2, except that the addition amount of lithium precursor was a molar ratio of 0.12 which is greater than the molar ratio of 0.1 in Embodiment 2.

Comparative Example 2: Same as Embodiment 2, except that the addition amount of lithium precursor was a molar ratio of 0.13 which is greater than the molar ratio of 0.1 in Embodiment 2.

The positive electrode was manufactured from a slurry prepared by weighing 96.25 wt % of the positive active material recovered from or prepared in each of Embodiments and Comparative Examples above, 1.5 wt % of carbon black that is a conductive material, and 2.25 wt % of PVdF (content of resin of 9.8 wt % with respect to PVdF 1100) that is a binder and mixing them with NMP.

Figure 3:
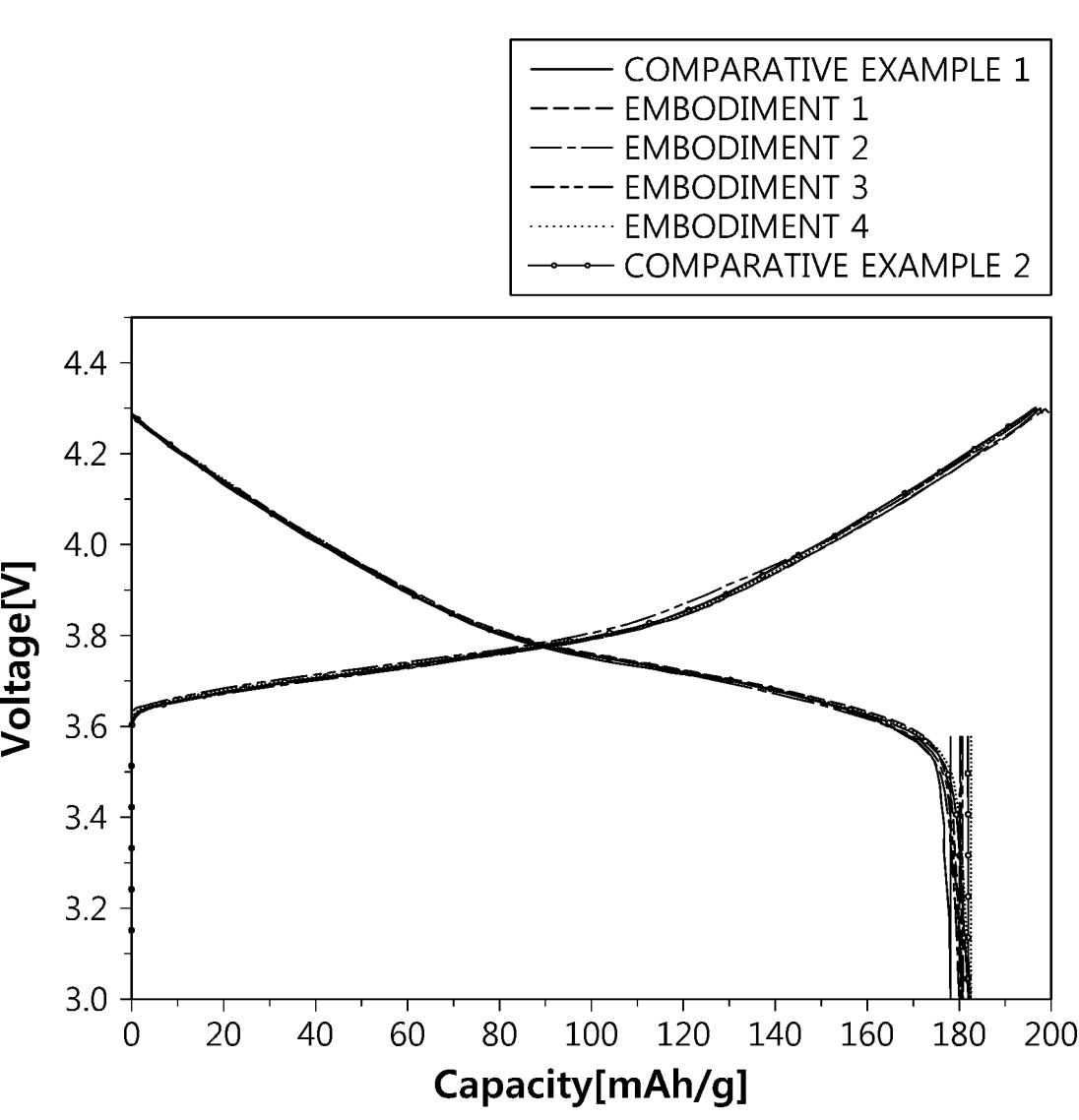
Figure 4:
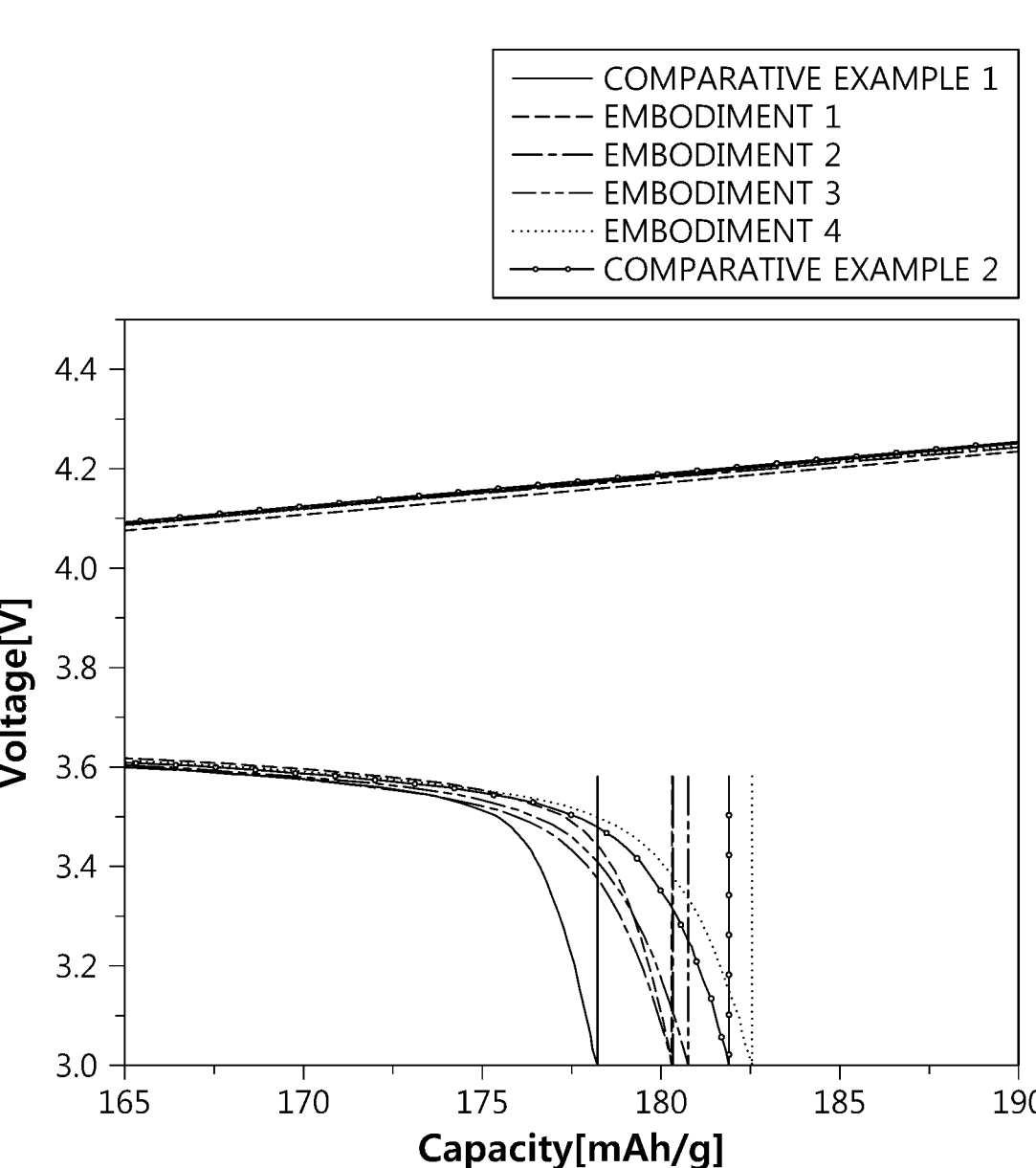
Figure 5:
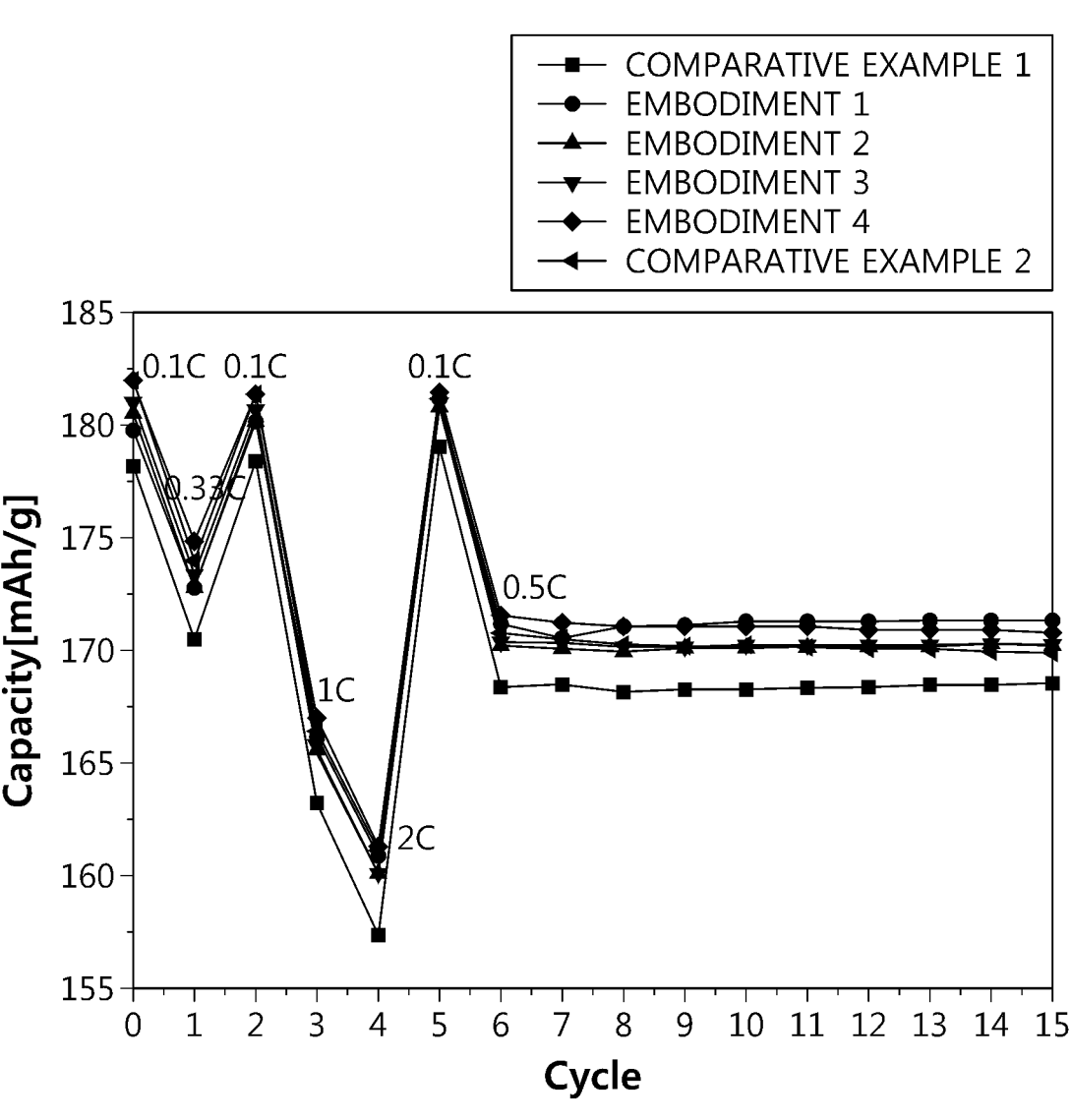

FIGS. 3 to 5 show results of cell evaluation using active materials of an embodiment and comparative examples.

FIG. 3 shows initial charging/discharging properties, FIG. 4 is an enlarged view of a partial period of FIG. 3. In FIGS. 3 and 4, the horizontal axis indicates capacity and the vertical axis indicates voltage.

In previous Experimental Example 1, it was confirmed that a molar ratio of lithium to other metals that needs to be added to the lithium precursor of Sample 8 may be equivalent to that of the fresh active material. In Embodiment 1, the lithium precursor of Sample 8 was added, and thus it may be predicted that the capacity properties of Embodiment 1 are similar to those of Comparative Example 1 which is the fresh active material. As a result of the experiment, upon measuring the initial charging/discharging capacity properties, when the lithium precursor at the malar ratio equal to or greater than 0.1 was added as in Embodiments 1 to 4, the capacity was equal to or greater than that of Comparative Example 1 which is the fresh active material, which was identical to the prediction. However, in Comparative Example 2 in which the lithium precursor at the molar ratio equal to or greater than 0.13 was added, the capacity was slightly decreased, and thus it was found that an addition of a certain amount or more of the lithium precursor increases the resistance and adversely affects the capacity properties.

FIG. 5 shows C-rate properties. The rate performance was reviewed by evaluating the capacity according to the number of cycle repetitions at different currents. The equipment used for evaluation is a general charging/discharging test apparatus that is well used in the laboratory. There is no deviation according to a measuring apparatus or method. In the graph of FIG. 3, the horizontal axis indicates the number of cycles and the vertical axis indicates the capacity. The voltage was set to 3 to 4.3V, and initial formation charging/discharging was performed at 0.1C/0.1C. An electrolyte constituting the cell that is carbonate-based, has 3:7 of ethylene carbonate (EC) to ethyl methyl carbonate (EMC), and partially includes an additive was used.

As shown in FIG. 5, the C-rate properties of Embodiments 2 to 4 in which boron coating was performed are similar. The initial charging/discharging capacity properties in Comparative Example 1 and Embodiments 2 and 4 are summarized in Table 2.

TABLE 2

| Charging/Discharging | Items | Comparative Example 1 | Embodiment 2 | Embodiment 4 |
|---|---|---|---|---|
| | Number of cells | 4 | 4 | 3 |
| 0.1 C/0.1 C Formation | Charging | 199.01 | 200.28 | 198.17 |
| | Discharging | 180.51 | 183.27 | 183.14 |
| | Efficiency | 90.7 | 91.51 | 92.41 |
| 0.33 C/0.33 C | Discharging | 172.77 | 175.98 | 175.96 |
| | Efficiency (%) compared to 0.1 C Formation | 95.71 | 96.02 | 96.08 |
| 0.5 C/0.1 C | Discharging | 180.07 | 182.77 | 182.7 |
| 0.5 C/1 C | Discharging | 165 | 168.01 | 168.28 |
| | Efficiency (%) compared to 0.1 C | 91.63 | 91.93 | 92.11 |
| 0.5 C/2 C | Discharging | 159.35 | 162.98 | 163.01 |
| | Efficiency (%) compared to 0.1 C | 88.49 | 89.17 | 89.22 |

FIG. 5 shows results that, as the number of cycle increases, the capacity of Embodiment 4 decreases compared to Embodiment 2. Although a decrease in the capacity of Embodiment 4 is an acceptable level, if the addition amount of the lithium precursor increases compared to Embodiment 4, it is not preferable in terms of the decrease in the capacity.

Therefore, it was confirmed that it is better to add the lithium precursor at a molar ratio equal to or less than 0.13 when considering the capacity properties, and it is better to add the lithium precursor at a molar ratio equal to or less than 0.12 when considering the cycle properties. Depending on the conditions of the experiment, the upper limit of addition of the lithium precursor may vary. Still, one of ordinary skill in the art will appreciate that the addition amount of the lithium precursor that does not deteriorate the capacity and cycle properties may be determined as proposed in the present disclosure.

Experimental Example 3: Correlation Between Addition Amount of Lithium Precursor and pH Titration With respect to Comparative Example 1 and Embodiments 2 and 4, 5 g of each active material was taken, dispersed in 100 ml of distilled water, mixed at 300 rpm for 5 minutes, and then the active material was filtered. While titrating a solution of 0.1M HCl in a filtered solution, pH and amounts of LiOH and $Li_2CO_3$ dissolved from the active material were measured.

Figure 6:
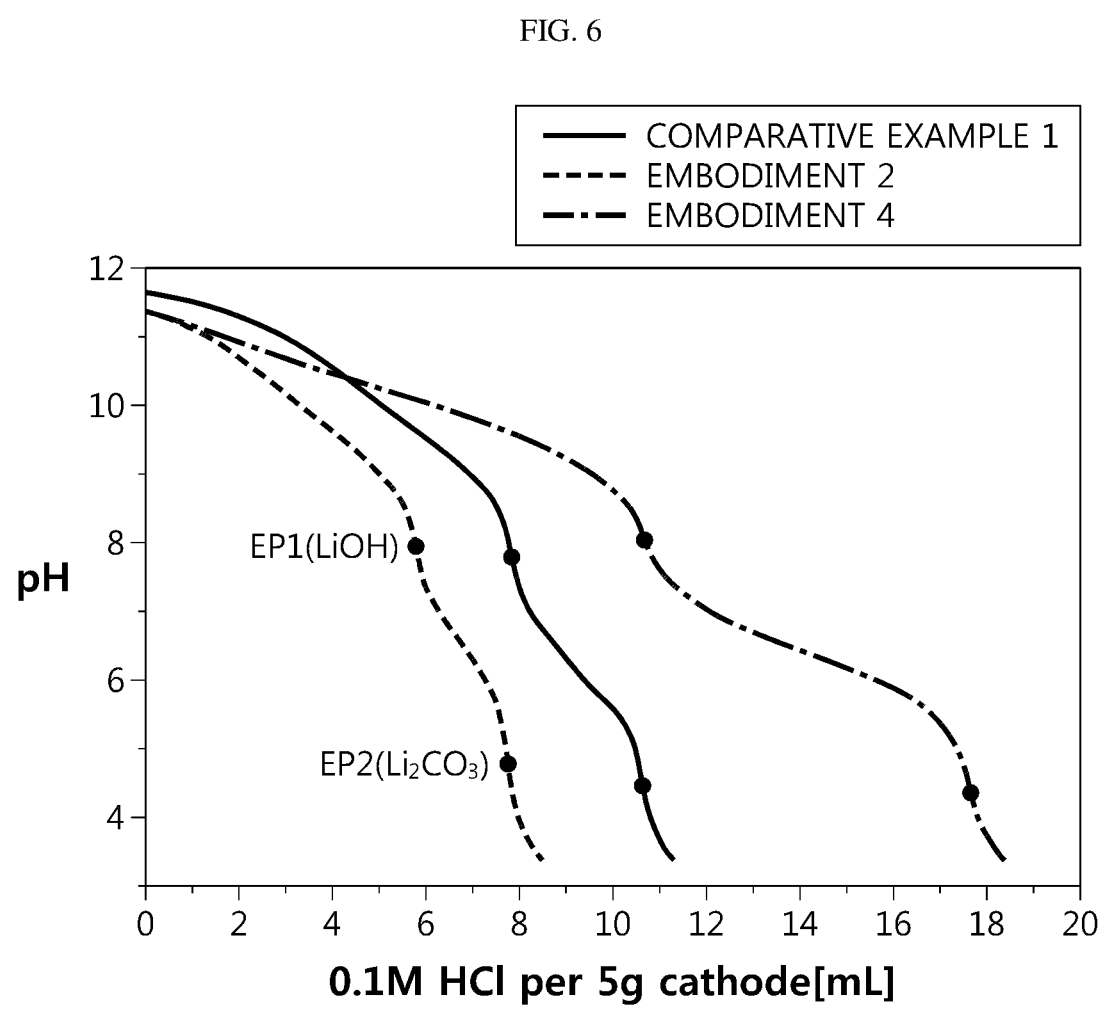

FIG. 6 is a graph of a pH titration result. Table 3 shows data obtained by calculating the amounts of LiOH and $Li_2CO_3$ remaining in the active material from the measured pH.

TABLE 3

| Item/Unit | | Comparative Example 1 | Embodiment 2 | Embodiment 4 |
|---|---|---|---|---|
| Remaining Lithium | LiOH(EP1)/wt % | 0.243 | 0.183 | 0.175 |
| | $Li_2CO_3$(EP2) | 0.41 | 0.29 | 1.037 |
| | Total remaining lithium compound | 0.653 | 0.473 | 1.212 |

The total remaining lithium compound is a value obtained by summing the remaining amounts of LiOH and $Li_2CO_3$.

It may be seen that Embodiment 2 has the remaining lithium compound equal to or less than that of Comparative Example 1, whereas Embodiment 4 has the remaining amount of $Li_2CO_3$ that is 2 and 3 times greater than that of Comparative Example 1 or Example 2. In the present experiment, since $Li_2CO_3$ was used as the lithium precursor, the remaining content of $Li_2CO_3$ is great, and the content of the remaining lithium compound (lithium precursor) may vary depending on what kind of lithium precursor is used.

Through Experimental Examples 1 and 2 above, it was confirmed that the capacity and lifespan properties are excellent when the addition amount of the lithium precursor is the molar ratio equal to or less than 0.12. In Experimental Example 3, the content of the remaining lithium compound was confirmed according to the addition amount of the lithium precursor. When the addition amount of the lithium precursor is at the molar ratio of 0.12, the amount of the remaining lithium compound is calculated as 1.212 wt %, so it was determined that the upper limit of the remaining lithium compound is 1.2 wt %.

Accordingly, when lithium is added by an amount that may be further added at the molar ratio equal to or less than 0.12 with respect to 1:1 that is a molar ratio of lithium to other metals, the amount of the remaining lithium compound may be equal to or less than 1.2 wt %. The amount of the remaining lithium compound greater than 1.2 wt % is not preferable since the cycle properties deteriorate and a gas generation rate increases as in Embodiment 4.

Since the remaining lithium compound varies depending on a type of the lithium precursor, it may affect the remaining amount of LiOH or $Li_2CO_3$, and thus the type of the lithium precursor or the type of the remaining lithium compound is not particularly limited. However, as mentioned above, if at least one of LiOH, $Li_2CO_3$, $LiNO_3$ and $Li_2O$ is used as the lithium precursor, the lithium precursor is preferably added by an amount of lithium that may be further added at a molar ratio of 0.09 to 0.12 with respect to 1:1 that is the molar ratio of lithium to other metals since characteristics equivalent to those of the fresh active material may be expected from the results of Experimental Examples 1 and 2. Then, after the reusable active material is obtained when all processes end, the amount of the remaining lithium compound in the active material may be 0.473 to 1.2 wt % as shown in Experimental Example 3.

In these experimental examples, up to the surface coating step was performed with 500 ppm of boron. If the amount of boron is further increased, the amount of lithium summed with boron increases, and thus the amount of the remaining lithium compound may be further reduced. Therefore, the lower limit of the amount of the remaining lithium compound is managed to be equal to or greater than 0.0001 wt % which is considered to be the measurable limit amount.

As described above, in order for the amount of the remaining lithium compound to be 0.0001 to 1.2 wt %, the addition amount of the lithium precursor should be appropriate. In the experimental example of the present disclosure, the lithium precursor is added by an amount of lithium that may be further added at a molar ratio of 0.0001 to 0.13 with respect to 1:1 that is the molar ratio of lithium to other metals, it was confirmed that the lifespan properties deteriorate with respect to a molar ratio of 0.12, and when lithium was added (converted) at the molar ratio of 0.12, the amount of the remaining lithium compound was 1.2 wt %. Since an appropriate molar ratio varies depending on the type of the lithium precursor, it is preferable to manage the addition amount of the lithium precursor by limiting the amount of the remaining lithium compound in the final product as in the present disclosure, without setting that the addition amount of the lithium precursor is comprehensively in a certain range.

Additional Experimental Examples

1) In order to know the amount of LiF remaining in the active material recovered from Sample 2 and Sample 3 of Experimental Example 1, F was detected and analyzed by ICP. In Sample 2, F was detected as 1450 mg/kg, and in Sample 3, F was measured as ND, that is, to be equal to or less than 30 ppm. That the content of F in the recovered positive active material is significantly reduced in Sample 3 compared to Sample 2 confirms that LiF is completely dissolved in the lithium compound aqueous solution by washing and removed to the extent that LiF may not be detected by ICP. Therefore, it may be seen that the removal of LiF is excellent by step s40 of the active material recovery method according to the present disclosure.

2) The rate performance was also reviewed with the active materials recovered from Samples 2 to 4 and Sample 7 of Experimental Example 1.

The active material before surface modification by step s40 is Sample 2, and the active material after surface modification is Sample 3. As a result of comparing the two active materials, it was confirmed that the electrode capacity in Sample 3 is rapidly reduced. This is because, as mentioned above, Ni in the NCM-based active material is rock salted by moisture and the capacity is reduced.

In another sample annealed (at 750° C. for 15 hours) without surface modification, there was almost no capacity improvement effect compared to Sample 2. This is because of LiF remaining on the surface of the active material when surface modification is not performed.

Sample 4 is a sample on which surface modification and annealing are performed after the first heat treatment. An increase in the capacity was confirmed in Sample 4. This is because, although the capacity is reduced as in Sample 3 after the surface modification step, the Ni rock salt is reduced through annealing after LiF is removed by surface modification and the structure is restored to the hexagonal crystal in Sample 4.

The capacity improvement of Sample 7 compared to sample 4 was also confirmed. Sample 7 was obtained by adding the lithium precursor at a molar ratio of 0.09 compared to Sample 4 during annealing. It may be seen that the capacity is improved by supplementing the lithium lost in the previous steps, by adding the lithium precursor as above. It was also confirmed that the capacity of Sample 7 shows the capacity improvement effect equivalent to that of Comparative Example 1 of Experimental Example 2 above.

As described above, according to the present disclosure, the active material may be recovered from the positive electrode scrap so as to be directly reused. It is safe because a toxic and explosive solvent such as NMP, DMC, acetone, and methanol is not used, and it is suitable for mass production because simple and safe methods such as heat treatment, cleaning and drying, and annealing are used.

3) With respect to the positive active materials recovered from or prepared in Experimental Examples 1 and 2, content of B and W which are specific element were also analyzed by ICP analysis.

The fresh active material used in the present experiment is Sample 1 or Comparative Example 1, and, as a result of the analysis, further includes B and W in which the content of B is 500 mg/kg and the content of W is 3100 mg/kg. As a result of measurement on Sample 2, the content of B was reduced to 200 mg/kg and the content of W was reduced to 2700 mg/kg. In Sample 3, Sample 4, and Sample 7, the content of B was ND as if B was almost entirely removed, and the content of W was greatly reduced to 200 mg/kg. Therefore, since according to a type of an initially used active material which may be vulnerable to heat and moisture, a specific element may be lost during the process, and in particular, the specific element may be completely removed or a small amount thereof remains during the surface modification process through cleaning, there may be a case in which it is difficult to fully recover characteristics by performing only up to the annealing step as in Sample 7. In such a case, it is preferable to perform an additional surface coating step as proposed in the present disclosure. The surface coating step is to coat B and W in the case of the present experimental example. In Embodiment 2, B coating was performed compare to Embodiment 1. As a result, surface coating may act as a surface protective layer of the positive electrode active material. Surface coating may also be a process that supplements a specific insufficient element and at the same time, rebuilds the surface protective layer in the fresh active material. In Embodiment 2, the lithium precursor was added by an amount of lithium that may be further added at a molar ratio of 0.1 with respect to 1:1 that is the molar ratio of lithium to other metals. The lithium precursor further added at the molar ratio of 0.1 reacts with B to form the surface protective layer, and partially remains. As confirmed in Experimental Example 3, the amount of the remaining lithium compound of Embodiment 2 is 0.473 wt %, and the capacity of the remaining lithium compound is equal to or greater than that of Comparative Example 1 and less than 1.2 wt % which is the upper limit of the remaining lithium compound with good lifespan properties, and thus it was evaluated as very desirable.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for recovering a positive electrode active material, comprising:
   (a) heat treating a positive electrode scrap including a positive electrode active material layer on a current collector in air to thermally decompose a binder and a conductive material in the positive electrode active material layer, separating the current collector from the positive electrode active material layer, and recovering an active material in the positive electrode active material layer, wherein the active material comprises a lithium composite transition metal oxide;
   (b) washing the recovered active material with a cleaning solution;
   (c) adding a lithium precursor to the washed active material and annealing the washed active material with the lithium precursor, and obtaining a reusable active material; and
   (d) optionally performing surface coating on the annealed active material,
   wherein the lithium precursor is added in an amount corresponding to a molar ratio of 0.09 to 0.12 of further added lithium with respect to the lithium component of 1:1 molar ratio of lithium to other metals in the positive electrode active material, and
   wherein an amount of a remaining lithium compound in the reusable active material is 0.0001 to 1.2 wt %.

2. The method of claim 1, wherein heat treating is performed for 10 minutes to 24 hours at 300 to 650° C.

3. The method of claim 1, wherein:
   the cleaning solution is a lithium compound aqueous solution showing basicity in an aqueous solution state,
   the lithium compound aqueous solution contains a lithium compound more than 0% and equal to or less than 15%, and
   the washing step (b) is performed for up to one week.

4. The method of claim 3, wherein washing is performed by impregnating the recovered active material in the lithium compound aqueous solution and at the same time stirring the recovered active material.

5. The method of claim 1, wherein the lithium precursor comprises at least one of LiOH, $Li_2CO_3$, $LiNO_3$ and $Li_2O$.

6. The method of claim 1, wherein, without drying after the washing, the lithium precursor is added in step (c) by mixing the washed active material in a lithium precursor solution and spray drying the active material.

7. The method of claim 6, wherein a temperature of the spray drying is 100 to 300° C.

8. The method of claim 1, wherein the annealing is performed at 400 to 1000° C. in air.

9. The method of claim 1, wherein a temperature of the annealing exceeds a melting point of the lithium precursor.

10. The method of claim 1, wherein the active material in the active material layer is recovered in powder form, and a carbon component generated by carbonization of the binder or the conductive material does not remain on a surface.

11. The method of claim 2, wherein the surface coating includes a coating of at least one of a metal, an organic metal and a carbon component on a surface of the annealed active material using a solid or liquid method, and then performing heat treatment at 100 to 1200° C.

12. The method of claim 1, wherein the reusable active material is represented by Chemical Formula 1 below, $$Li_aNi_xMn_yCo_zM_wO_{2+\delta} \tag{1}$$

wherein M includes at least one selected from the group consisting of B, W, Al, Ti and Mg, $1 < a \leq 1.1$, $0 \leq x < 0.95$, $0 \leq y < 0.8$, $0 \leq z < 1.0$, $0 \leq w \leq 0.1$, $-0.02 \leq \delta \leq 0.02$, and $x+y+z+w=1$.

13. The method of claim 1, wherein the reusable active material includes a content of fluorine (F) equal to or less than 100 ppm.

* * * * *